(12) United States Patent
Gargash et al.

(10) Patent No.: US 8,745,629 B2
(45) Date of Patent: Jun. 3, 2014

(54) SYSTEM AND METHOD OF CONTROLLING POWER IN AN ELECTRONIC DEVICE

(75) Inventors: Norman S. Gargash, San Diego, CA (US); Brian J. Salsbery, San Diego, CA (US); Mark Guzzi, San Diego, CA (US); Chris Barrett, San Diego, CA (US); Praveen Chidambaram, San Diego, CA (US); Yizheng Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 12/845,974

(22) Filed: Jul. 29, 2010

(65) Prior Publication Data

US 2011/0173628 A1 Jul. 14, 2011

Related U.S. Application Data

(60) Provisional application No. 61/294,014, filed on Jan. 11, 2010.

(51) Int. Cl.
*G06F 9/46* (2006.01)

(52) U.S. Cl.
USPC ........................................................ 718/104

(58) Field of Classification Search
USPC ........................................................ 718/104
See application file for complete search history.

(56) References Cited

U.S. PATENT DOCUMENTS

| | | | |
|---|---|---|---|
| 5,768,587 A | 6/1998 | Freund et al. | |
| 5,881,238 A * | 3/1999 | Aman et al. | 709/226 |
| 6,014,700 A * | 1/2000 | Bainbridge et al. | 709/226 |
| 6,427,161 B1 * | 7/2002 | LiVecchi | 718/102 |
| 6,633,916 B2 | 10/2003 | Kauffman | |
| 7,103,639 B2 | 9/2006 | Walton et al. | |
| 7,644,410 B1 * | 1/2010 | Graupner et al. | 718/104 |
| 7,711,966 B2 | 5/2010 | Prabhakaran et al. | |
| 2005/0022173 A1 | 1/2005 | Kanade | |
| 2005/0223382 A1 * | 10/2005 | Lippett | 718/103 |
| 2007/0049239 A1 * | 3/2007 | Joung et al. | 455/343.1 |
| 2007/0052391 A1 * | 3/2007 | Kim et al. | 320/128 |
| 2007/0081504 A1 * | 4/2007 | Shih et al. | 370/338 |
| 2008/0066072 A1 * | 3/2008 | Yurekli et al. | 718/104 |
| 2008/0133956 A1 * | 6/2008 | Fadell | 713/340 |
| 2008/0184248 A1 * | 7/2008 | Barua et al. | 718/104 |
| 2008/0271030 A1 * | 10/2008 | Herington | 718/104 |
| 2008/0289000 A1 * | 11/2008 | Young et al. | 726/1 |
| 2008/0300026 A1 * | 12/2008 | Ban et al. | 455/572 |
| 2009/0005126 A1 * | 1/2009 | Wang et al. | 455/574 |

(Continued)

FOREIGN PATENT DOCUMENTS

| | | |
|---|---|---|
| EP | 1519269 A2 | 3/2005 |
| EP | 1640861 A1 | 3/2006 |

(Continued)

OTHER PUBLICATIONS

International Search Report and Written Opinion—PCT/US2011/020689-ISA/EPO—Jun. 15, 2011.

*Primary Examiner* — Sujay Koneru

(74) *Attorney, Agent, or Firm* — Nicholas A. Cole

(57) ABSTRACT

A method of utilizing a node power architecture (NPA) system, the method includes receiving a request to create a client, determining whether a resource is compatible with the request, and returning a client handle when the resource is compatible with the request.

9 Claims, 14 Drawing Sheets

(56) References Cited

U.S. PATENT DOCUMENTS

| | | |
|---|---|---|
| 2009/0199193 A1* | 8/2009 | Jackson .................. 718/104 |
| 2009/0300632 A1 | 12/2009 | Falcon et al. |
| 2010/0063756 A1* | 3/2010 | Agrawal et al. ............. 702/63 |
| 2010/0241881 A1* | 9/2010 | Barsness et al. ............ 713/320 |
| 2011/0113274 A1* | 5/2011 | Burchard et al. ............ 713/322 |

FOREIGN PATENT DOCUMENTS

| | | |
|---|---|---|
| GB | 2325999 A | 12/1998 |
| GB | 2348985 A | 10/2000 |
| JP | 2005004350 A | 1/2005 |
| JP | 2005100264 A | 4/2005 |
| JP | 2009181374 A | 8/2009 |

* cited by examiner

SYSTEM AND METHOD OF CONTROLLING POWER IN AN ELECTRONIC DEVICE

RELATED APPLICATIONS

The present application claims priority to U.S. Provisional Patent Application Ser. No. 61/294,014, entitled SYSTEM AND METHOD OF CONTROLLING POWER IN AN ELECTRONIC DEVICE, filed on Jan. 11, 2010, the contents of which are fully incorporated by reference.

DESCRIPTION OF THE RELATED ART

Portable computing devices (PDs) are ubiquitous. These devices may include cellular telephones, portable digital assistants (PDAs), portable game consoles, palmtop computers, and other portable electronic devices. In addition to the primary function of these devices, many include peripheral functions. For example, a cellular telephone may include the primary function of making cellular telephone calls and the peripheral functions of a still camera, a video camera, global positioning system (GPS) navigation, web browsing, sending and receiving emails, sending and receiving text messages, push-to-talk capabilities, etc. As the functionality of such a device increases, the computing or processing power required to support such functionality also increases. Further, as the computing power increases, there exists a greater need to effectively manage the processor, or processors, that provide the computing power.

Accordingly, what is needed is an improved method of controlling power in an electronic device.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
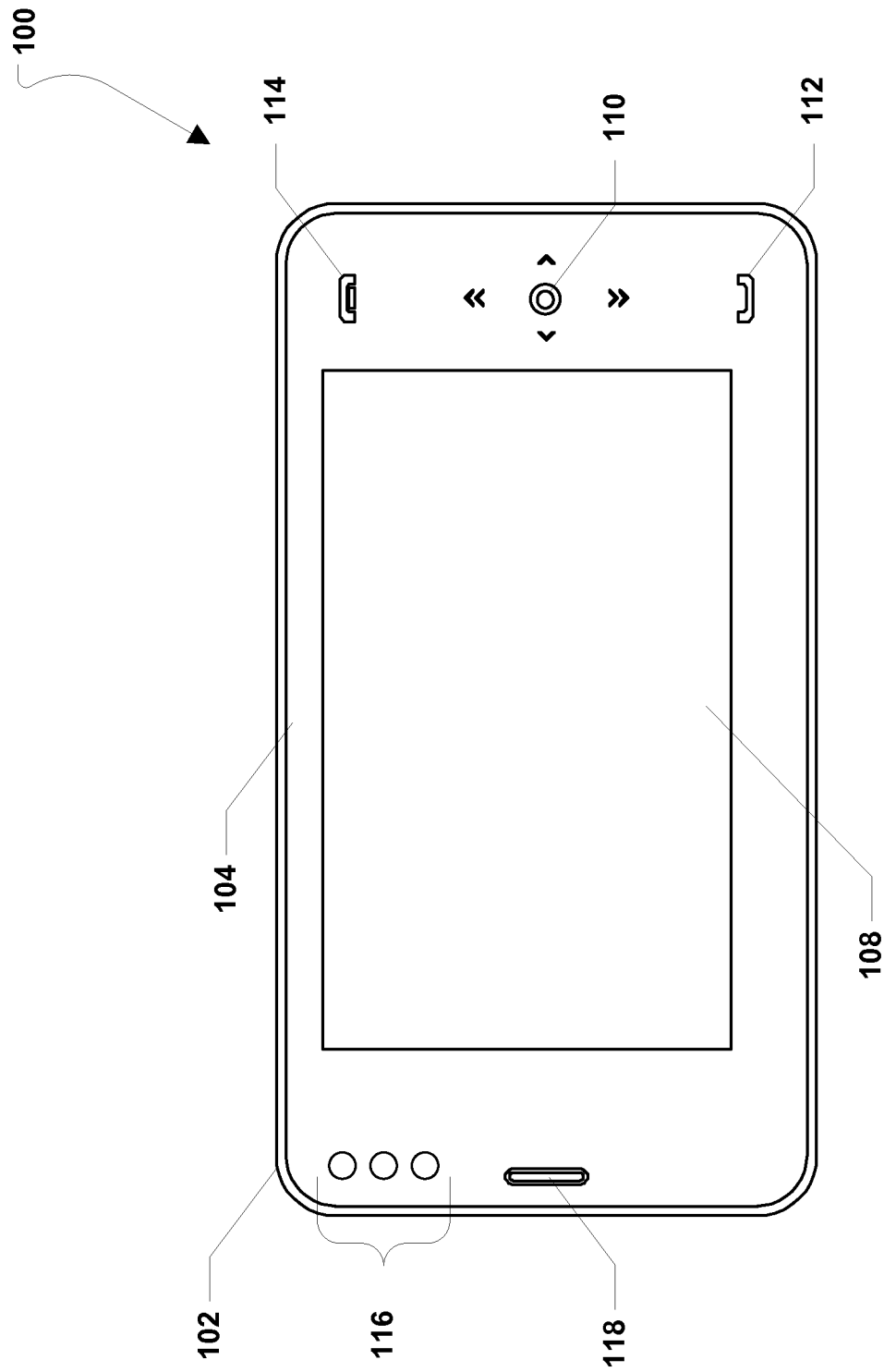
FIG. 1 is a front plan view of a first aspect of a portable computing device (PCD) in a closed position.
Figure 2:
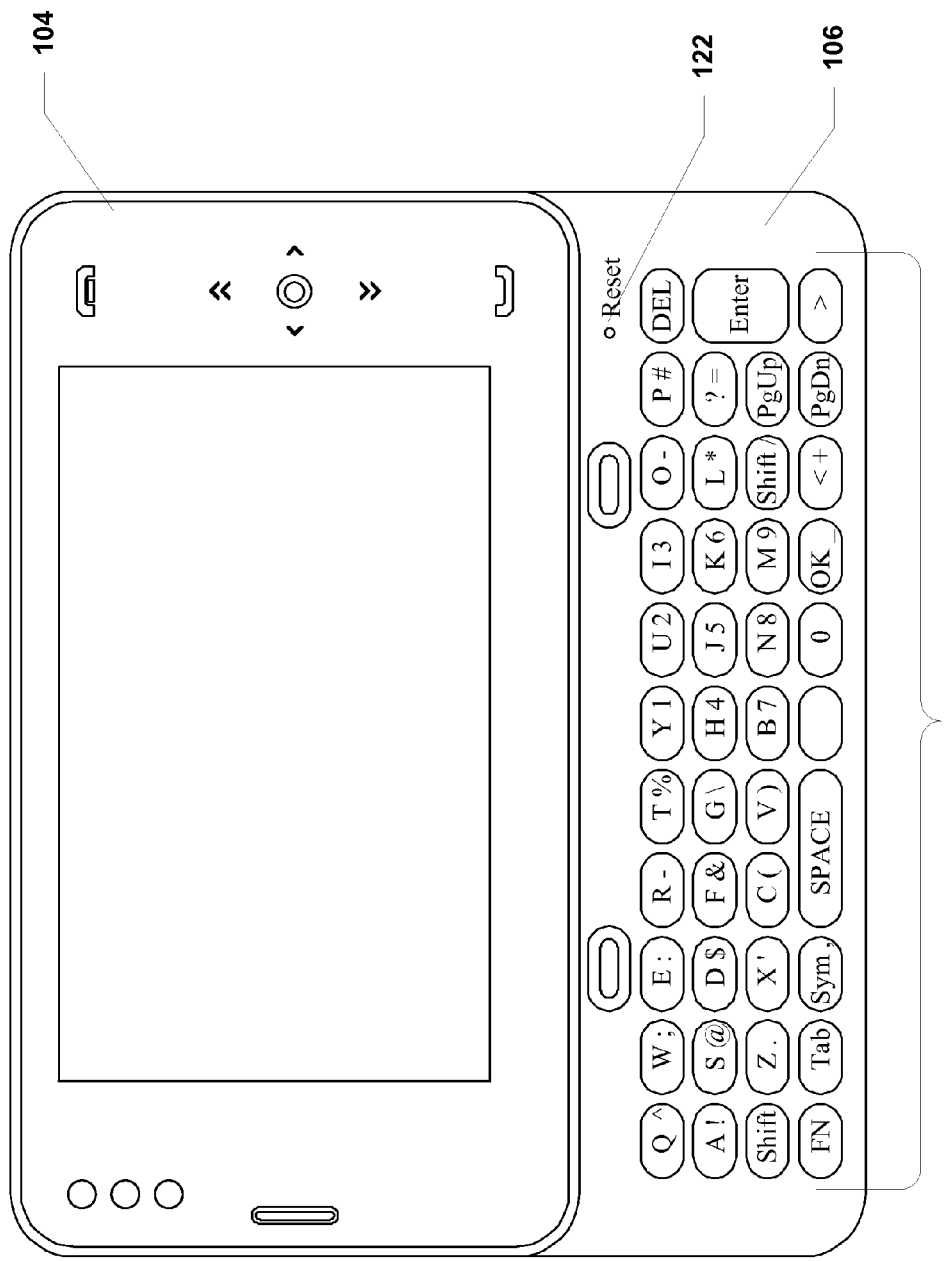
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
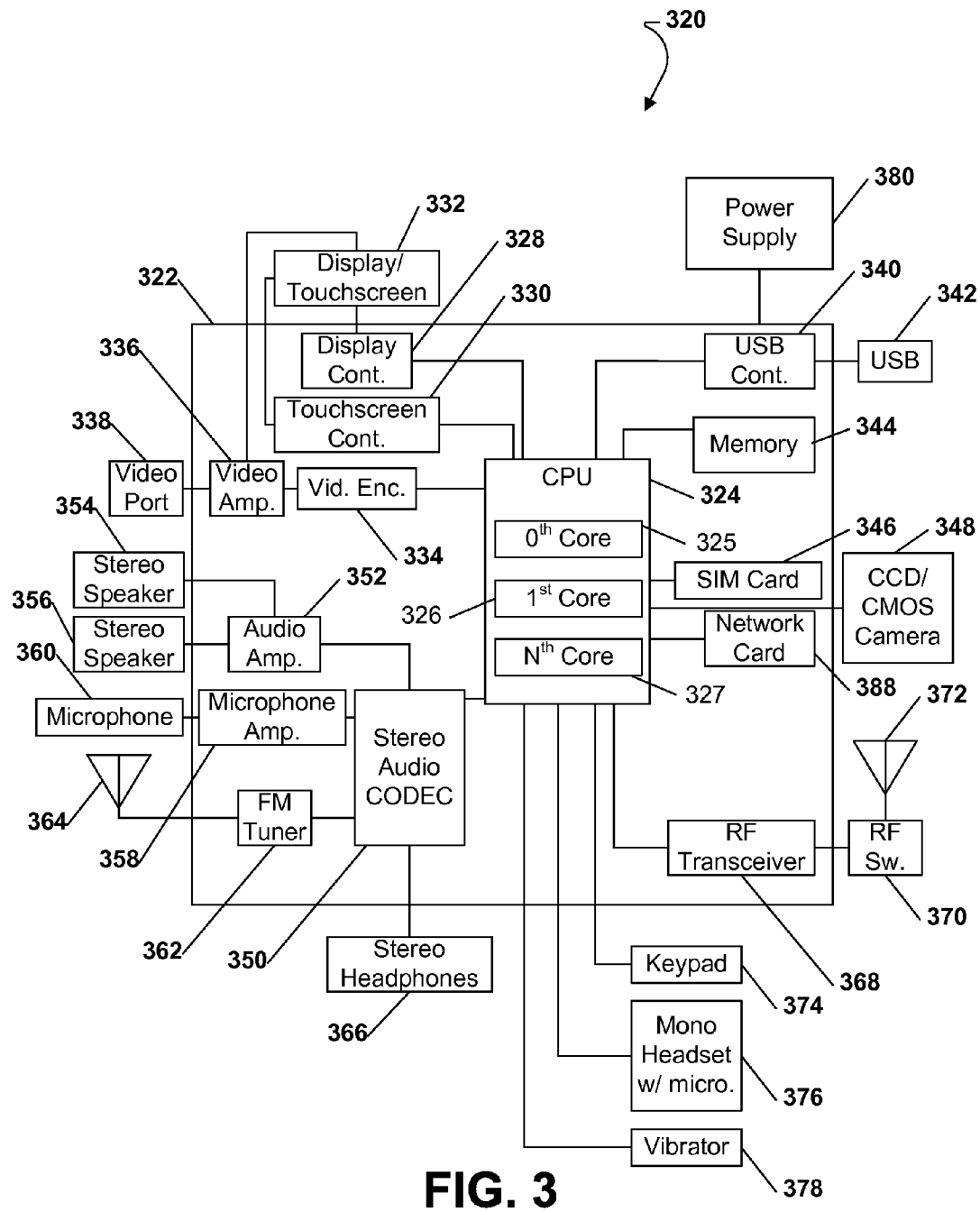
FIG. 3 is a block diagram of a second aspect of a PCD.

Referring to FIG. 3, an exemplary, non-limiting aspect of a portable computing device (PCD) is shown and is generally designated 320. As shown, the PCD 320 includes an on-chip system 322 that includes a multicore CPU 324. The multicore CPU 324 may include a zeroth core 325, a first core 326, and an Nth core 327.

As illustrated in FIG. 3, a display controller 328 and a touch screen controller 330 are coupled to the multicore CPU 324. In turn, a touch screen display 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system(s) committee (NTSC) encoder, is coupled to the multicore CPU 324. Further, a video amplifier 336 is coupled to the video encoder 334 and the touch screen display 332. Also, a video port 338 is coupled to the video amplifier 336. As depicted in FIG. 3, a universal serial bus (USB) controller 340 is coupled to the multicore CPU 324. Also, a USB port 342 is coupled to the USB controller 340. A memory 344 and a subscriber identity module (SIM) card 346 may also be coupled to the multicore CPU 324. Further, as shown in FIG. 3, a digital camera 348 may be coupled to the multicore CPU 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the multicore CPU 324. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the multicore CPU 324. An RF switch 370 may be coupled to the RF transceiver 368 and an RF antenna 372. As shown in FIG. 3, a keypad 374 may be coupled to the multicore CPU 324. Also, a mono headset with a microphone 376 may be coupled to the multicore CPU 324. Further, a vibrator device 378 may be coupled to the multicore CPU 324. FIG. 3 also shows that a power supply 380 may be coupled to the on-chip system 322. In a particular aspect, the power supply 380 is a direct current (DC) power supply that provides power to the various components of the PCD 320 that require power. Further, in a particular aspect, the power supply is a rechargeable DC battery or a DC power supply that is derived from an alternating current (AC) to DC transformer that is connected to an AC power source.

FIG. 3 further indicates that the PCD 320 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the touch screen display 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by the multicore CPU 324 in order to perform the methods described herein. Further, the multicore CPU 324, the memory 344, or a combination thereof may serve as a means for executing one or more of the method steps described herein in order to sample data within a central processing unit.

Figure 4:
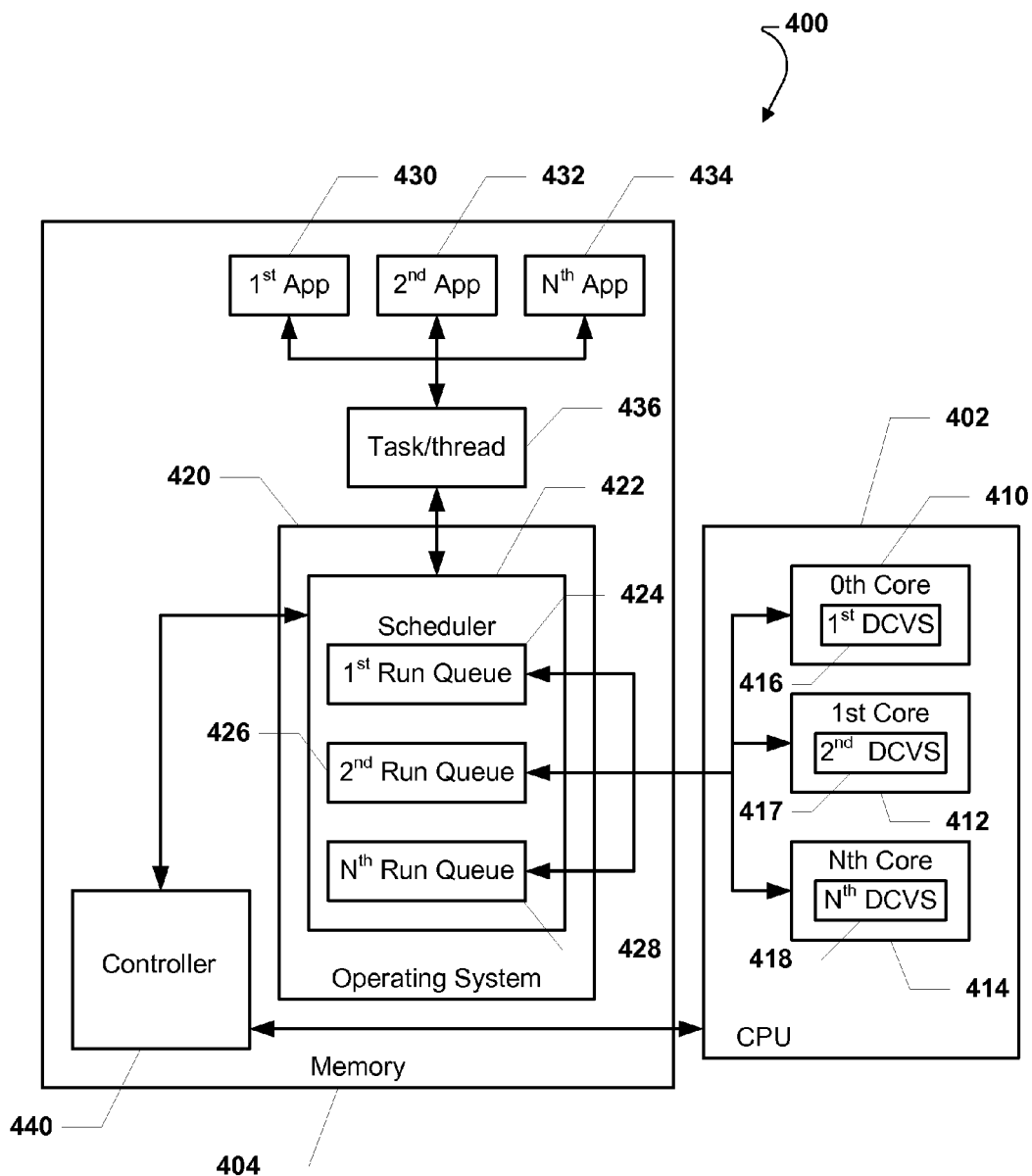
FIG. 4 is a block diagram of a processing system.

Referring to FIG. 4, a processing system is shown and is generally designated 400. In a particular aspect, the processing system 400 may be incorporated into the PCD 320 described above in conjunction with FIG. 3. As shown, the processing system 400 may include a multicore central processing unit (CPU) 402 and a memory 404 connected to the multicore CPU 402. The multicore CPU 402 may include a zeroth core 410, a first core 412, and an Nth core 414. The zeroth core 410 may include a zeroth dynamic clock and voltage scaling (DCVS) algorithm 416 executing thereon. The first core 412 may include a first DCVS algorithm 417 executing thereon. Further, the Nth core 414 may include an Nth DCVS algorithm 418 executing thereon. In a particular aspect, each DCVS algorithm 416, 417, 418 may be independently executed on a respective core 410, 412, 414.

Moreover, as illustrated, the memory 404 may include an operating system 420 stored thereon. The operating system 420 may include a scheduler 422 and the scheduler 422 may include a first run queue 424, a second run queue 426, and an Nth run queue 428. The memory 404 may also include a first application 430, a second application 432, and an Nth application 434 stored thereon.

In a particular aspect, the applications 430, 432, 434 may send one or more tasks 436 to the operating system 420 to be processed at the cores 410, 412, 414 within the multicore CPU 402. The tasks 436 may be processed, or executed, as single tasks, threads, or a combination thereof. Further, the scheduler 422 may schedule the tasks, threads, or a combination thereof for execution within the multicore CPU 402. Additionally, the scheduler 422 may place the tasks, threads, or a combination thereof in the run queues 424, 426, 428. The cores 410, 412, 414 may retrieve the tasks, threads, or a combination thereof from the run queues 424, 426, 428 as instructed, e.g., by the operating system 420 for processing, or execution, of those task and threads at the cores 410, 412, 414.

FIG. 4 also shows that the memory 404 may include a controller 440 stored thereon. The controller 440 may be connected to the operating system 420 and the multicore CPU 402. Specifically, the controller 440 may be connected to the scheduler 422 within the operating system 420. As described herein, the controller 440 may monitor the workload on the cores 410, 412, 414 and the controller 440 may sample data from the cores 410, 412, 414 as described below.

In a particular aspect, the controller 440 may be a software program. However, in an alternative aspect, the controller 440 may be a hardware controller that is external to the memory 404. In either case, the controller 440, the memory 404, the cores 410, 412, 414, or any combination thereof may serve as a means for executing one or more of the method steps described herein in order to sample data from the cores 410, 412, 414.

Figure 5:
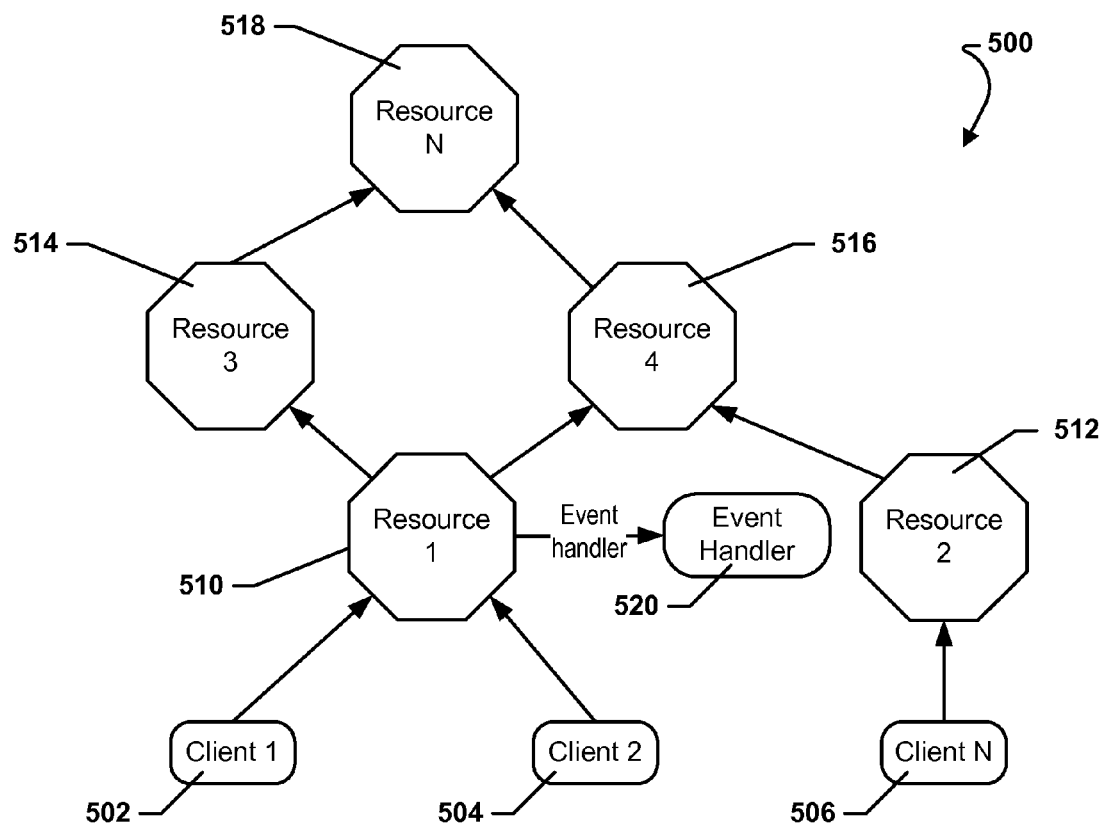
FIG. 5 is a block diagram of a first aspect of a node power architecture (NPA) system.

Referring to FIG. 5, a node power architecture (NPA) system is shown and is generally designated 500. The NPA system 500 may include a first client 502, a second client 504, and an Nth client 506. Further, the NPA system 500 may include a first resource 510 connected to the first client 502 and the second client 504. A second resource 512 may be connected to the Nth client 506.

Further, as illustrated in FIG. 5, the NPA system 500 may include a third resource 514 connected to the first resource 510. A fourth resource 516 may be connected to the first resource 510 and the second resource 512. Moreover, an Nth resource 518 may be connected to the third resource 514 and the fourth resource 516. FIG. 5 further indicates that an event handler 520 may be connected to the first resource 510. The event handler 520 may receive one or more events 522 from the first resource 510.

In a particular aspect, each resource 510, 512, 514, 516, 518 may be a central processing unit, a core, a modem, a clock, a bus, etc. Each client 502, 504, 506 may be a software application. In the alternative, each client 502, 504, 506 may represent a software application or an instance of a software application.

It may be appreciated that the connectivity shown in FIG. 5 is exemplary and is not intended to limit the scope of the NPA system 500. Further, it may be appreciated that any number of clients and any number of resources may be included in the system 500. Also, the clients and resources may be interconnected in numerous ways not shown in FIG. 5.

In a particular aspect, as shown in FIG. 5, the NPA system 500 may be shown as a directed acyclic graph structure instead of code. Further, the NPA system 500 may make inter-resource dependencies explicit and may implicitly document the components of the NPA system 500. Further, the NPA system 500 may ease the porting of resources and clients to new hardware (HW). In a particular aspect, a client 502, 504, 506 may issue requests to any resources directly used. Indirect requests may be issued from resource to resource.

The NPA system 500 may also enhance work requests beyond on, off, or level. Further, the NPA system 500 may allow hints and deadlines to be issued by clients, resources, or a combination thereof. The hints may indicate a particular workload requirement of a client or resource as expressed in instructions per second, e.g., millions of instructions per second (MIPS). Alternatively, the workload requirement may be expressed as a frequency, e.g., a kilohertz value (kHz), a megahertz (MHz) value, a gigahertz (GHz) value, etc. In another aspect, the workload requirement may be expressed as a data transfer rate, e.g., kilobits per second (KB/S), megabits per second (MB/S), gigabits per second (GB/S), or a combination thereof. Further, the workload requirement may be expressed as any combination described above. The deadline associated with a particular workload requirement may indicate when a particular workload must be finished.

The NPA system 500 shown in FIG. 5 further provides separate power optimization from resource requests. For example, the NPA system 500 may utilize hints, durations, deadlines, or a combination thereof in order to optimize power without having to modify client requests.

The NPA system 500 may include an event mechanism, i.e., the event handler 520, for the notification of resource state changes. The event handler 520 may allow software programs to react to resources as they are enabled, disable, oversubscribed etc. Further, the event handler 520 may allow dynamic profiling of resource utilization. Since the NPA system 500 may be considered a distributed system, this may allow additional resources to be dynamically added to the NPA system 500. Further, power optimization may be performed separately from resource definition.

In a particular aspect, the resources 510, 512, 514, 516, 518 may be nodes in the NPA system 500. The clients 502, 504, 506 may be edges. Each resource 510, 512, 514, 516, 518 may propagate requests, as necessary, to other resources 510, 512, 514, 516, 518 connected thereto. In particular, each resource 510, 512, 514, 516, 518 may issue requests to dependent resources 510, 512, 514, 516, 518 via clients 502, 504, 506 in the same manner as external requests are issued. More specifically, from the perspective of a resource 510, 512, 514, 516, 518 there may be no distinction between an external client 502, 504, 506 issuing a request or another resource 510, 512, 514, 516, 518 issuing a request. In a particular aspect, resource 510, 512, 514, 516, 518 may be dynamically added. Further, clients 502, 504, 506 and the event handler 520, or handlers, may be dynamically added and removed.

In a particular aspect, the resources 510, 512, 514, 516, 518 may be the entities that the clients 502, 504, 506 may issue work requests against. All resource requests and updates may be logged. Moreover, the resources 510, 512, 514, 516, 518 may be responsible for meeting the various client requests and optimizing power consumption. In a particular aspect, the function responsible for determining the correct level to meet the client requests, i.e., workload, may be user defined and overridden. The function responsible for updating the hardware (HW) and other resource dependencies may be user-definable.

In the NPA system 500 all resources 510, 512, 514, 516, 518 may be identified by name. Further, using the NPA system 500 there is no compile-time linkage between the clients 502, 504, 506 and the resources 510, 512, 514, 516, 518. Specifically, the string lookup may be resolved at the time that the clients 502, 504, 506 are created. Further, there is no request-time overhead. Each resource 510, 512, 514, 516, 518 may have multiple names, i.e., aliases and each resource 510, 512, 514, 516, 518 may define its own units, e.g., MIPS, MHz, MB/S, etc., and work requests are made in the defined units.

The resource graph, FIG. 5, that shows the NPA system 500 is highly dynamic and does not always appear as show in FIG. 5. The resource graph that represents the NPA system 500 is constructed during initialization of the device in which the resources and clients are installed. Clients and event handlers may be added dynamically and client requests may be issued against resources. Resources may aggregate multiple concurrent requests to compute a new resource state. Moreover, resources may update and cancel dependency requests as needed in order to satisfy a new resource state.

Figure 6:
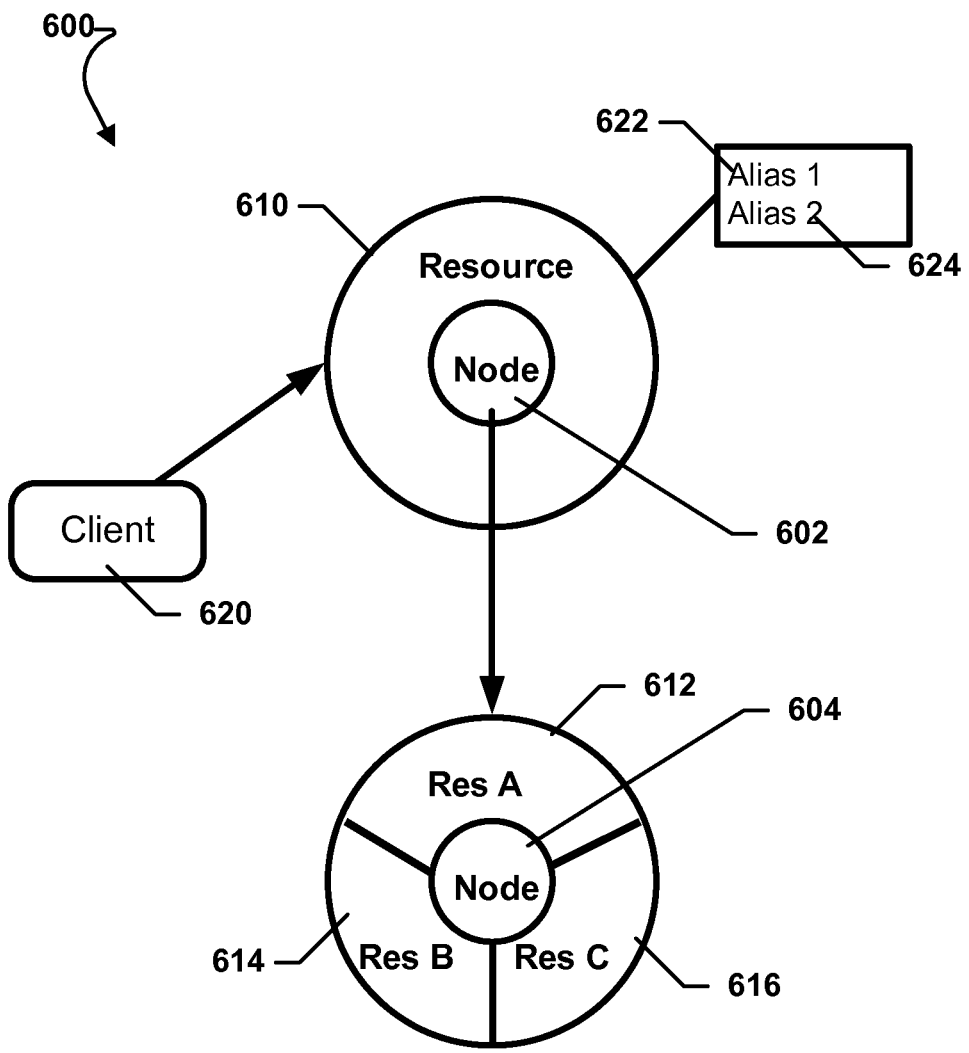
FIG. 6 is a block diagram of a second aspect of a node power architecture (NPA) system.

FIG. 6 illustrates another aspect of a NPA system, designated 600. As shown, the NPA system 600 includes a first node 602 connected to a second node 604. The first node 602 includes a first resource 610. The second node 604 includes a second resource 612, a third resource 614, and a fourth resource 616. As shown, a client 620 is connected to the first node 602. In a particular aspect, the first resource 610 may include a first alias 622 and a second alias 624.

In a particular aspect, a node 602, 604 may be a collection of one or more resources 610, 612, 614, 616. A node with more than one resource is called a compound node, e.g., the second node 604. An example of a compound node may include a coupled CPU and bus clock. The same driver function may be share by both CPU and bus resources. Updating one clock may implicitly update the other clock.

Resources 610, 612, 614, 616 may be named interfaces. The naming convention may be file-system-like, e.g., /clk/cpu, /bus/arbiter, etc. Resources 610, 612, 614, 616 may represent physical resources, e.g., a clock, a voltage rail, etc. Resources 610, 612, 614, 616 may also represent a logical resource, e.g., a CPU, a bus, etc. Resources 610, 612, 614, 616 may also represent subsystem use cases, e.g., a bus flow. Further, resources 610, 612, 614, 616 may present a control signal, e.g., DCVS enable, etc.

An example of a logical resource may include a CPU latency resource. In such a case, a client may issue a request with a particular latency requirement. A sleep task may use the constraint to allow, or disallow, certain low power modes. As a sleep state is implemented, or new hardware changes lower power mode (LPM) transition times, lower power modes may be enable or potential failure cases may be avoid. In such a case, any changes to the LPM behavior may be transparent to all registered clients.

As stated herein, the same resource may have more than one name, i.e., a symlink or an alias. This may establish a virtual resource. In such a case, multiple hardware (HW) independent names may be created for the resource. For example, one resource may be named "/power/cpu" and "/power/C2". These names may be linked together and links may be defined independently of the resource definition. In a particular aspect, resources must exist prior to a link being created and links may be resolved at client creation time. Further, no request-time overhead may be incurred.

The use of virtual resources may provide some hardware abstraction. In other words, clients do not need to know which rail powers a particular CPU and clients do not need to know which CPU they are operating on.

In a particular aspect, a node 602, 604 may manage the dependencies of all the collected resources 610, 612, 614, 616. Moreover, each resource 612, 614, 616 in a compound node 604 may share the same driver function, dependencies, NPA lock, or a combination thereof. Also, in a particular aspect, updates, or requests, to each resource 612, 614, 616 in a compound node 604 may be processed atomically. Driver and update functions may access the state of all resources 612, 614, 616 in a compound node 604. Each node 602, 604 may be identified by name, or alias and each node name may be used to identify dependencies.

Nodes 602, 604 may be defined via a set of structures that include a name, a driver function (which may be a custom function), one or more attributes, user data, a dependency array, a resource definition array, or any combination thereof. The dependency array may include a name of dependency and a dependency client type. A resource definition array may be provided and may include a resource name, a maximum value, one or more resource attributes, a plug-in from a library (e.g., an update function), user data, or a combination thereof.

A node creation function may utilize a node definition structure, an initial resource state array, an optional node creation event, or a combination thereof. After all of the node dependencies exist, the node creation function may create one or more resources and adds them to a resource graph. Further, the node creation function may create clients for dependencies and the node creation function may invoke driver functions with initial values. In a particular aspect, a node may not be created until all dependencies for the node exist. A client may be notified when a node is fully constructed.

In a particular aspect, a resource graph that represents an NPA system may be constructed in a distributed manner. Any technology may define its own resources and add them to the graph. Nodes can be defined in arbitrary order.

Figure 7:
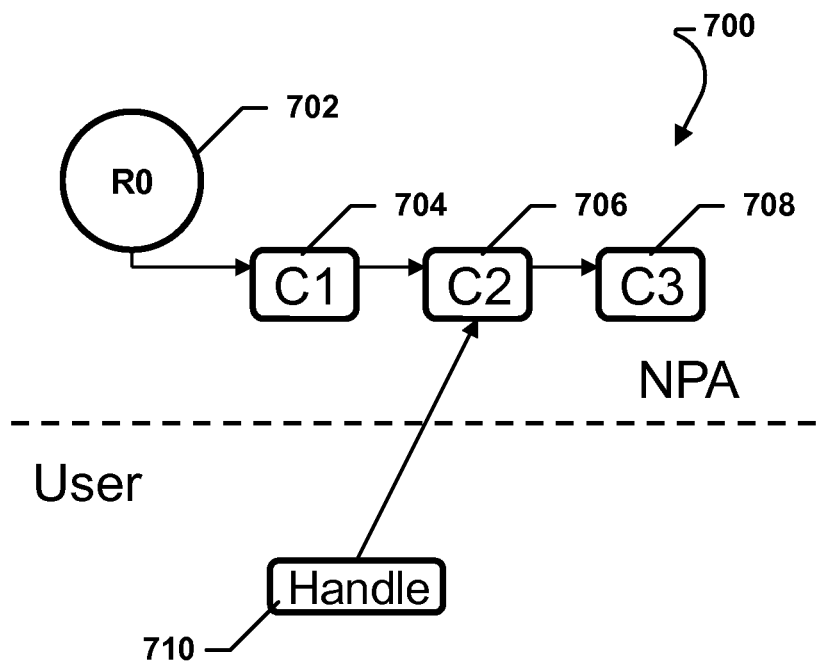
FIG. 7 is a block diagram of a third aspect of a node power architecture (NPA) system.

FIG. 7 shows a third aspect of an NPA system, designate 700. As shown, the NPA system 700 may include a resource 702. The resource 702 may include a collection of all actively registered clients. The collection may be a list that includes a first client 704, a second client 706, and a third client 708. The clients 704, 706, 708 may be associated with the resource 702 and not to each other. The clients 704, 706, 708 may be used to issue work requests to the resource 702. Moreover, the clients 704, 706, 708 may be synchronous or asynchronous. In a particular aspect, synchronous clients may not return until a request is completed. Asynchronous clients may return immediately and invoke user callback when a request is completed.

The work request may include a work model. The work model may include registered workloads, impulse workloads, isochronous workloads, pulsed workloads, best effort workloads, scheduled workloads, etc.

Additionally, the resource 702 may further customize a client via optional client creation and client destruction function. The resource 702 may use a client's user_data field to add arbitrary extra data to each client. This data may be used form caching workload statistics, client identification, database access, etc.

A registered workload may include a workload may indicate one or more requirements to complete the workload, e.g., a particular CPU frequency. An impulse workload may include a workload that has a well known starting point, but no well known end, and no well known load. An isochronous workload may be a workload that occurs at a substantially regular interval at a substantially regular duration. A pulsed workloads may include workloads that begin at a certain level and automatically ceases at fixed time interval. Further, a best effort workload may include a hint that there is work that could be performed, but is not performance critical, it can be arbitrarily deferred. The schedule workload may be a workload that includes a notification that some amount of work will be required at a defined point in the future. Each type of workload may indicate its type before it is performed and the resource may utilize the workload type to effectively and efficiently perform the workload, e.g., by altering a dynamic clock and voltage scaling (DCVS) algorithm.

In a particular aspect, each client 704, 706, 708 may be identified by name. Each client name may be used for informational purposes. Further, in a particular aspect, users may access clients via an opaque client handle 710. Client requests may be derived from hardware (HW) feedback, e.g., CPU idle time, bus monitoring, etc and from software (SW) applications. A user may register clients 704, 706, 708 with the resource 702 in order to issue requests to the resource 702. Client registration may happen at runtime and a resource 702 may support multiple client request types. Each client type is potentially a different interface and some default client types may be defined.

Figure 8:
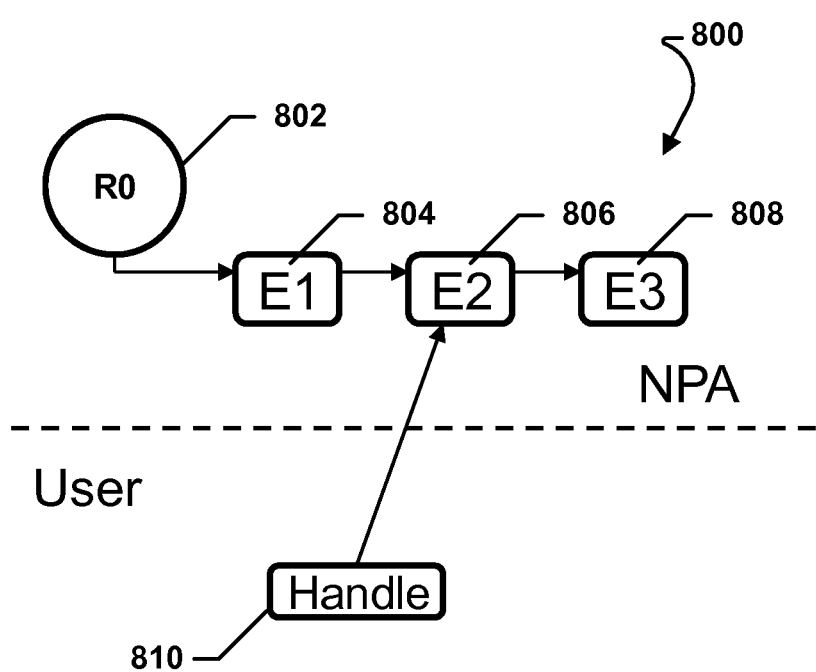
FIG. 8 is a block diagram of a fourth aspect of a node power architecture (NPA) system.

Referring now to FIG. 8, a fourth aspect of an NPA system is shown and is designated 800. As shown, the NPA system 800 may include a resource 802. The resource 802 may include a collection of all registered event handlers. The collection of registered event handlers may be a list and may include a first event handler 804, a second event handler 806, and a third event handler 808. The event handlers 802, 804, 806 may be associated with the resource 802, but not to each other.

As shown, the resource 802 may include a list of event handlers 804, 806, 808. Clients may register event handlers 804, 806, 808. However, an event handler 804, 806, 808 may not always be associated with a client. Users may access event handlers 804, 806, 808 via an opaque event handler handle 810.

In a particular aspect, each event handler 804, 806, 808 may register for hi watermarks, lo watermarks, or a combination thereof and the watermarks may be expressed as headroom. Events may include any changes in a resource state, e.g., for profiling purposes. Moreover, events may be used to monitor resource loads or trigger other actions off resource state changes. This may be used to reduce a workload when a resource is oversubscribed or disable optional functions when a resource goes away.

In a particular aspect, every public NPA call may be logged to a common log file. The log may use names, i.e., strings, that are human readable. String parsing may happen in a separate thread.

Figure 9:
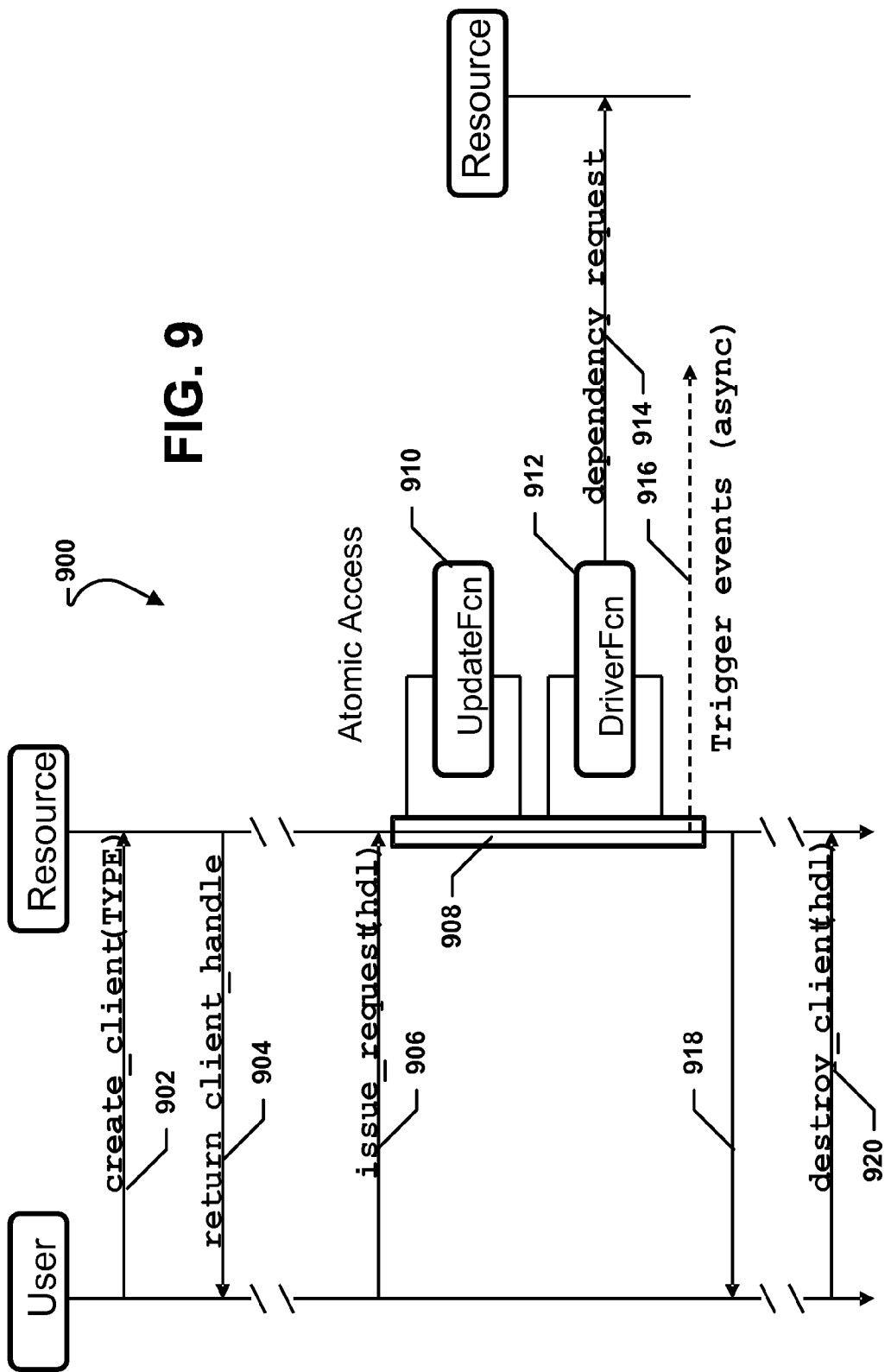
FIG. 9 is a flowchart illustrating a method of utilizing an NPA system.

Referring now to FIG. 9, a method of utilizing an NPA system is shown and is generally designated 900. As shown, beginning at step 902, a user, i.e., a software application, may create a particular type of client for a resource using a create client function. The create client function may include the following arguments: resource name, client name, client work model, or a combination thereof. At step 904, after the resource receives the request to create a client, the resource may return a client handle for the client. The client should check the return value in order to determine that a handle was actually created. If a handle is not created, e.g., due to an incompatible work model, lack of availability at the resource, etc. The method 900 may end and the user may attempt to create a client for another resource.

At step 906, the user may use the handle to issue a work request to the resource. Work includes the resource state, e.g., on, off, level, and the duration for which the state is needed. Work request parameters may be known or unknown. Known parameters are requirements to the resource. Unknown parameters may be hinted and may be modified by the resource.

If possible, a resource must honor a work request with known work parameters. The client may register with an event handler to receive notification if the request will not be met. Unknown and hinted work parameters may provide opportunities for the resource to optimize power consumption. Where possible, clients should leave parameters unknown, or hinted, in order to maximize opportunities for power optimization.

The work request may also include a work model. The work model may include registered workloads, impulse workloads, isochronous workloads, pulsed workloads, best effort workloads, scheduled workloads, etc. If a work model does not make sense for a resource, or is incompatible with a particular resource, the resource may not support the work model. Accordingly, if the resource does not support a particular work model, the work request may fail when the client is created at step 902. In a particular aspect, other work models may be defined as necessary and new work models may be added in a backwards-compatible fashion.

Moving to step 908, the request may be processed atomically in two stages: an update function is performed and a driver function is performed. Specifically, at step 910 an update function may be performed to aggregate the new request with any outstanding client requests in order to determine a new resource state. In other words, the update function may be invoked by the resource to compute the resource state given concurrent client request of various work models. For example, if one client requires at least 200 MIPS and another client requires at least 350 MIPS, the update function may determine that the new resource state should be at least 350 MIPS in order to satisfy both clients. In another aspect, the client requirements may be summed and 550 MIPS may be the new resource state. The update function maybe considered a plug-in that is dynamic, i.e., the update function may be overridden. For example, the update function may be overridden in order to optimize power consumption without changing the clients of the resource. The update function may also be overridden in a bring up situation or a de-bug situation to force a resource to an on state.

In a particular aspect, the update function may use the resource and the requesting client as argument. Further, the current active client requests and the pending client requests are available to the update function. The update function may return a desired state and the desired state as computed by the update function may not be supported by hardware (HW). A driver function may quantize the desired state as needed.

Next, at step 912, a driver function may be performed. The driver function applies the new resource state calculated by the update function to the resource. Accordingly, the driver function updates the managed resource and issues one or more requests to dependent resources. Target dependencies may be captured in the driver function. Further, the driver function may differ on a per-target basis without changing the client interface or the update function.

The driver function may utilize a resource and a desired state as arguments. Specifically, the driver function may compute the desired state in MIPS and derive a frequency request to a CPU clock and a bandwidth (BW) request to a bus. The driver function may issue requests to dependencies, as describe below. The dependencies may be a function of state. Further, dependencies may be indexed from the dependency array that is part of the resource definition array. The driver function may also issue requests to hardware (HW). However, these requests may not be necessary if the resource is a logical resource. Further, the driver function may return an actual state set associated with the resource and its dependencies.

At step 914, the driver function issues a dependency request to any other dependent resources as necessary. For example, if the resource is unable to apply the new state, the resource may pass the client request to another resource connected thereto in the node associated with the resource, if available. At step 916, the resource may output one or more trigger events to an event handler. The trigger events may be a function of the resource state. The trigger events may be used to monitor the resource load or trigger other actions off resource state changes. For example, the trigger events may be used to reduce a workload when a resource is oversubscribed or disable optional functions when a resource goes away.

Moving to step 918, the resource may be utilized by the user until the need for the resource is finished by the user. At step 920, when the user not longer needs the issue requests, the user may transmit a request to destroy the client handle and the resource may destroy the client handle. The method 900 may then end. It may be appreciated that users may cancel requests without destroying the client handle. This may allow a client handle to be reused.

Figure 10:
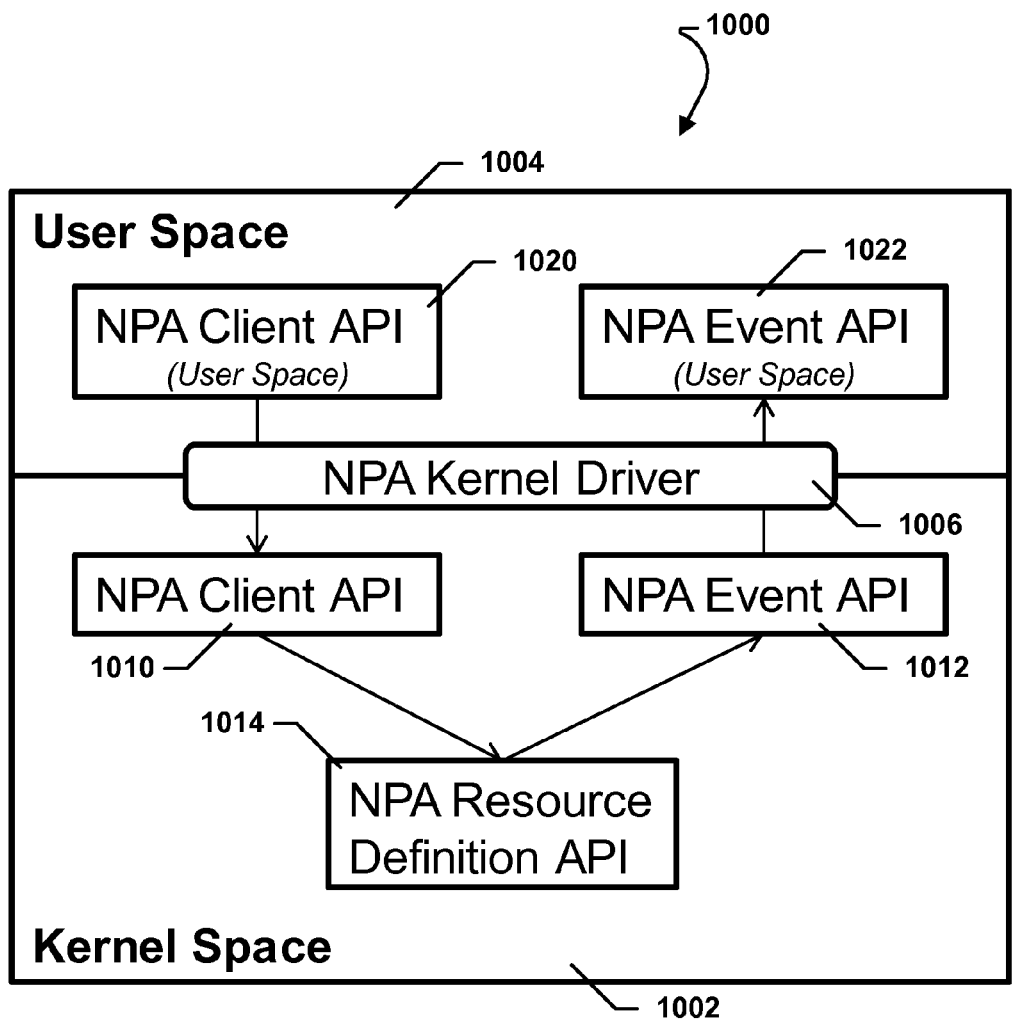
FIG. 10 is a block diagram of a fifth aspect of a node power architecture (NPA) system.

FIG. 10 shows a fifth aspect of an NPA system that is generally designated 1000. As illustrated, the system 1000 may include a kernel space 1002 and a user space 1004. An NPA kernel driver 1006 may provide an interface between the kernel space 1002 and the user space 1004. As shown in FIG. 10, the kernel space 1002 may include a kernel space NPA client application programming interface (API) 1010 that may be connected to the NPA kernel driver 1006. Further, the kernel space 1002 may include a kernel space NPA event API 1012 connected to the NPA kernel driver 1006. A kernel space NPA resource definition API 1014 is connected to the kernel space NPA client API 1010 and the kernel space NPA event API 1012.

As depicted in FIG. 10, the user space 1004 of the NPA system 1000 may include a user space NPA client API 1020 connected to the NPA kernel driver 1006. Moreover, a user space NPA event API 1022 may be connected to the NPA kernel driver 1006.

In a particular aspect, any element in the kernel space may have full access to the NPA functionality. For example, any element in the kernel space may issue requests and receive events to any resource. Further, any element in the kernel space may create resources. In another aspect, the user space NPA client API 1020 may be a duplicate of the kernel space NPA client API 1010 and the user space NPA event API 1022 may be a duplicate of the kernel space NPA event API 1012. Elements in the user space may issued requests and receive events, but only to explicitly exported resources. The elements in the user space, however, may not create resources.

In a particular aspect, user space NPA client API 1020 may issue a request to the kernel space NPA client API 1010 through the NPA kernel driver 1006. The kernel space NPA client API 1010 may pass the request to the kernel space NPA resource definition API 1014. The kernel space NPA resource definition API 1014 may return an event to the kernel space NPA event API 1012. Then, the kernel space NPA event API 1012 may pass the event to the user space NPA event API 1022 through the NPA kernel driver 1006.

The NPA kernel driver 1006 may be configured to operate with a specific operation system (OS). Further, the NPA kernel driver 1006 may provide a user space library that maps the NPA API onto the kernel driver model. The user space APIs 1020, 1022 that are on top of the NPA kernel driver 1006 may be configured to operate independently of the OS. A resource author may not have to write any kernel driver code to allow user space access to resources.

It may be appreciated that NPA resource graphs may be processor-local, i.e., each processor, or address space, may define its own resource graph. However, there are some resources that may be shared across processors. These shared resources may be controlled on one processor, e.g., a modem. Alternatively, these shared resources may be controlled by a common resource manager, e.g., a resource power manager (RPM). Clients may not know if a resource is local or distributed.

In a particular aspect, a distributed resource may be any resource that requires action by a resource on another processor in order to service a request. A remote resource may be a distributed resource that maintains a local state independent of the state of the resource on another processor. Further, a proxy resource may be a distributed resource whose state tracks the state of the resource on another processor. A resource on another processor (ROAP) may be the resource to which the distributed resource is distributing access. The ROAP may not know that it is being accessed in a distributed fashion.

A distributed resource with local aggregation may be distributed resource that aggregates all requests locally and issues the aggregated request to the ROAP. A distributed resource with local aggregation only requires one client on the ROAP. A distributed resource with remote aggregation may be a distributed resource that forwards each request independently to the ROAP for aggregation on the other processor. A distributed resource with remote aggregation requires one client on the ROAP per local client. In a particular aspect, the various distributed use cases may require that one or more of the following NPA functions be exported by the remote interface: create_client, destroy_client, issue_request, register_event, resource_available, and query_state.

Figure 11:
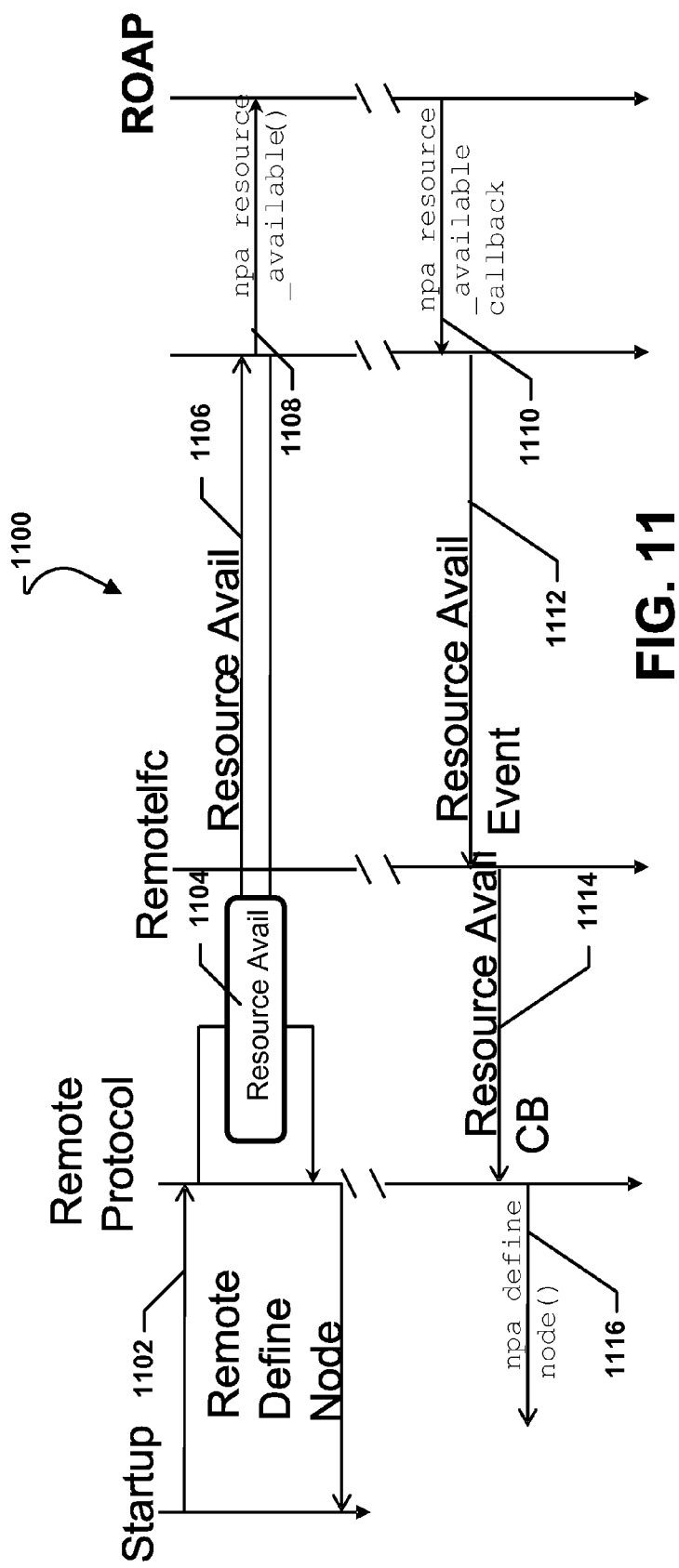
FIG. 11 is a flowchart illustrating a method of creating a distributed resource.

FIG. 11 illustrates a method of creating a distributed resource. The method may be generally designated 1100. The method 1100 may begin at step 1102 with a request to define a remote resource. The request may be made to a remote protocol. At step 1104, the remote protocol may invoke a resource available function to determine whether a ROAP is available. The resource available function may trigger a resource available event to a remote interface at step 1106. The resource available event may be transmitted through the remote interface to the ROAP in order to have the ROAP invoke an npa_resource_available function to determine whether the ROAP is available, at step 1108. If the ROAP is available, at step 1110, the ROAP may invoke an npa_resource_available_callback function in order to generate a resource available event which may be transmitted to the remote interface, at step 1112. Then, at step 1114, the remote interface may issue a resource available callback to the remote protocol. The remote protocol may then invoke an npa_define_node function in order to define the node at step 1116.

Figure 12:
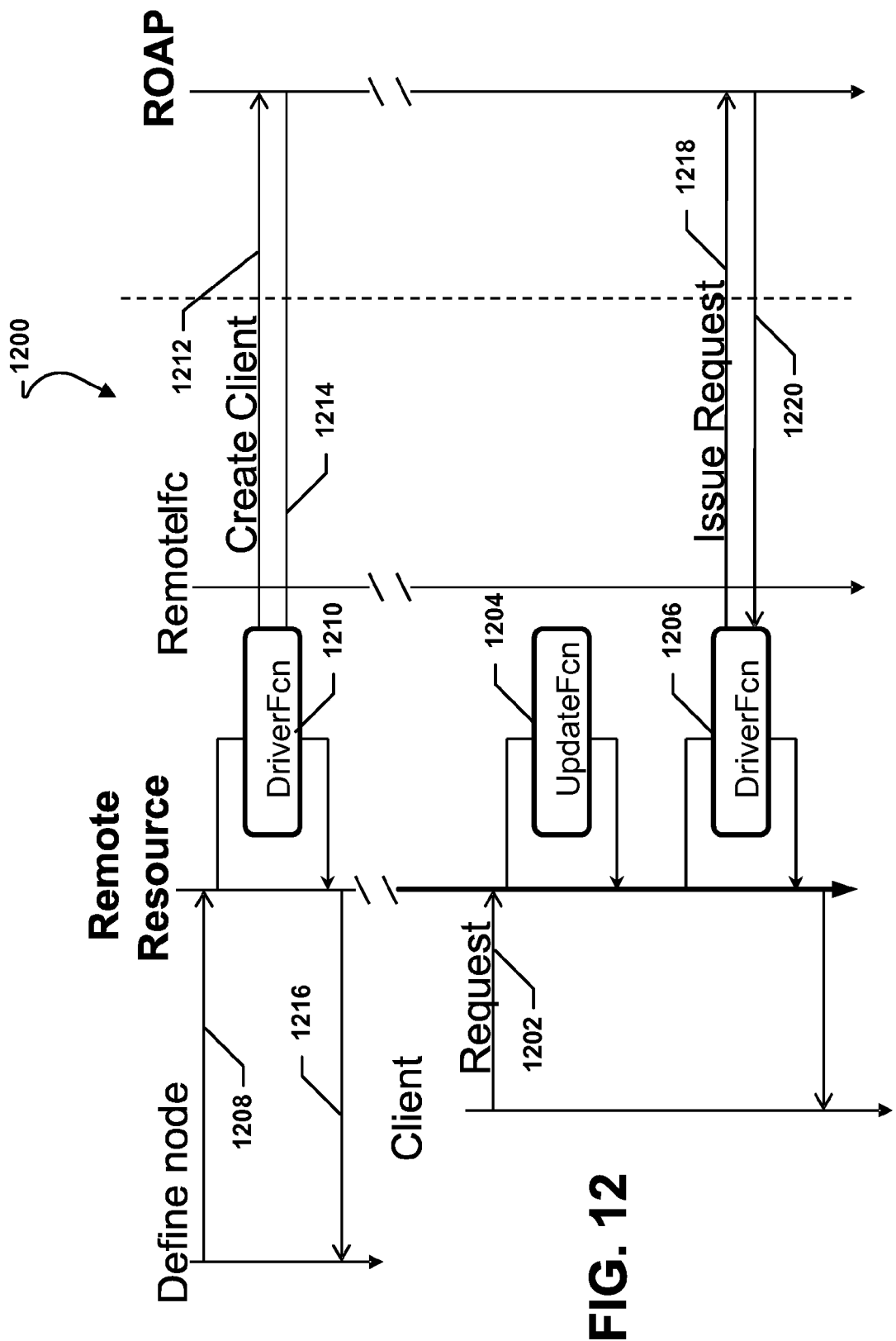
FIG. 12 is a flowchart illustrating a method of using a remote resource with local aggregation.

Referring now to FIG. 12, a method of using a remote resource with local aggregation is shown and is generally designated 1200. As shown, the method 1200 may begin at step 1202 with a request to create a client. The request to create a client may cause the remote resource to invoke an update function at step 1204 and a driver function at step 1206.

At step 1208, a define node function may be invoked. This may cause the remote resource to invoke a driver function, at step 1210. When invoked, the driver function may trigger a create client event, at step 1212. The create client event may be passed through a remote interface to a ROAP. The ROAP may return a handle to the remote resource at step 1214. Thereafter, at step 1216, the node definition may be completed. At step 1218, the remote resource may issue a work request, on behalf of the client, to the ROAP. At step 1220, the ROAP may perform the work until it is finished.

Figure 13:
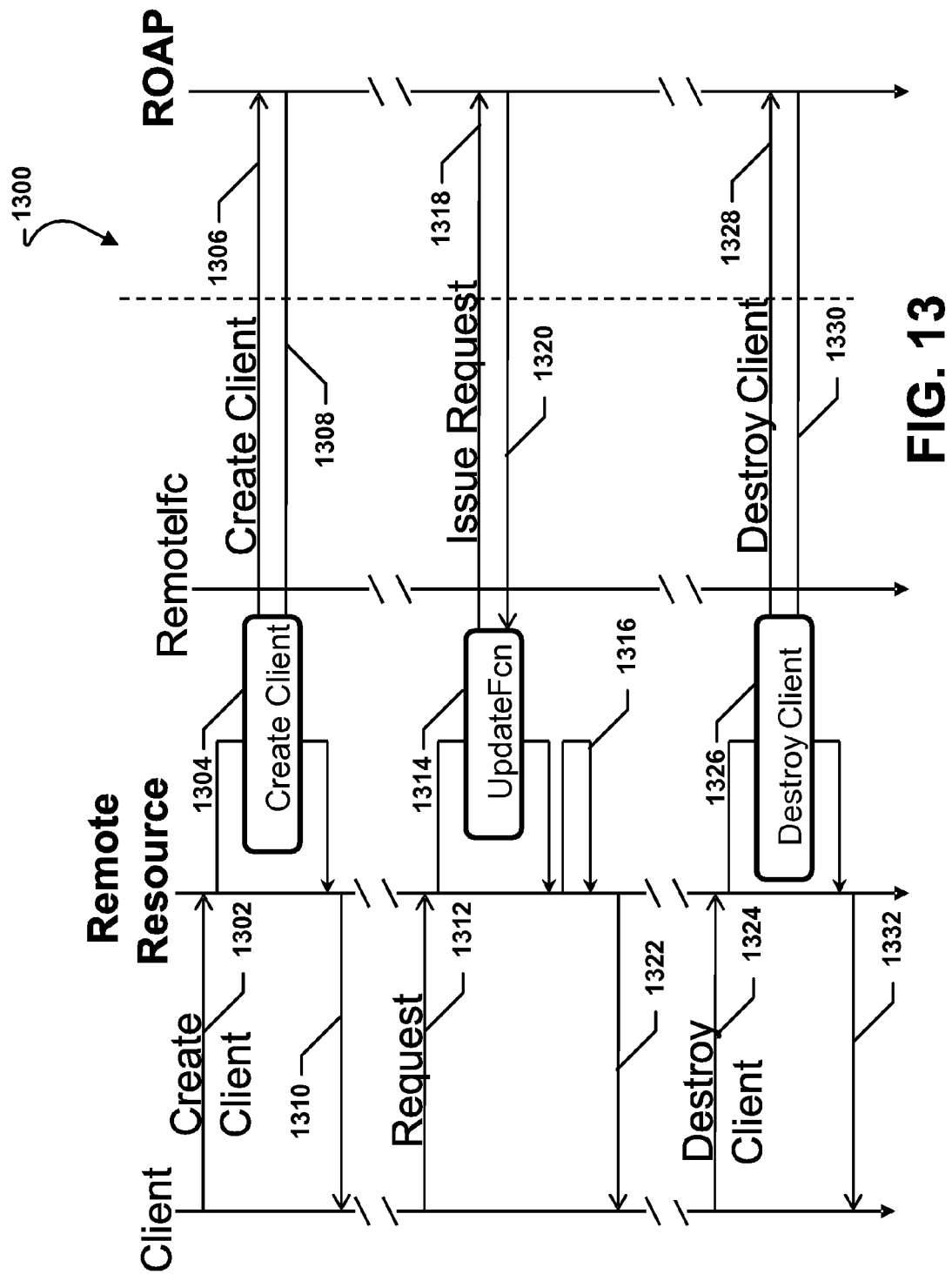
FIG. 13 is a flowchart illustrating a method of using a remote resource with distributed aggregation.

FIG. 13 illustrates a method of using a remote resource with remote aggregation. The method may be generally designated 1300. At step 1302, a request to create a client may be submitted to the remote resource. At step 1304, the remote resource may invoke a create client function. The create client function may trigger a create client event, at step 1306, that may be transmitted to a ROAP via a remote interface. At step 1308, the ROAP may transmit a handle to the remote resource through the remote interface. The remote resource may pass the handle to the client at step 1310.

Moving to step 1312, the client may issue a work request to the remote resource. At step 1314, the remote resource may invoke an update function. Further, at step 1316, the remote resource may invoke a driver function. Thereafter, at step 1318, the remote resource may issue a work request to the ROAP. At step 1320, the ROAP may perform the work as needed and pass the work to the remote resource. At step 1322, the remote resource may transmit the work to the client.

At step 1324, the client may issue a request to destroy a client handle to the remote resource. The remote resource may invoke a destroy client handle function at step 1326. Then, at step 1328, the remote resource may output a destroy client event to the ROAP. The ROAP may return an event indicating that the client is destroyed at step 1330 to the remote resource. Then, the remote resource may transmit an indication to the client indicating that the client handle is destroyed.

Figure 14:
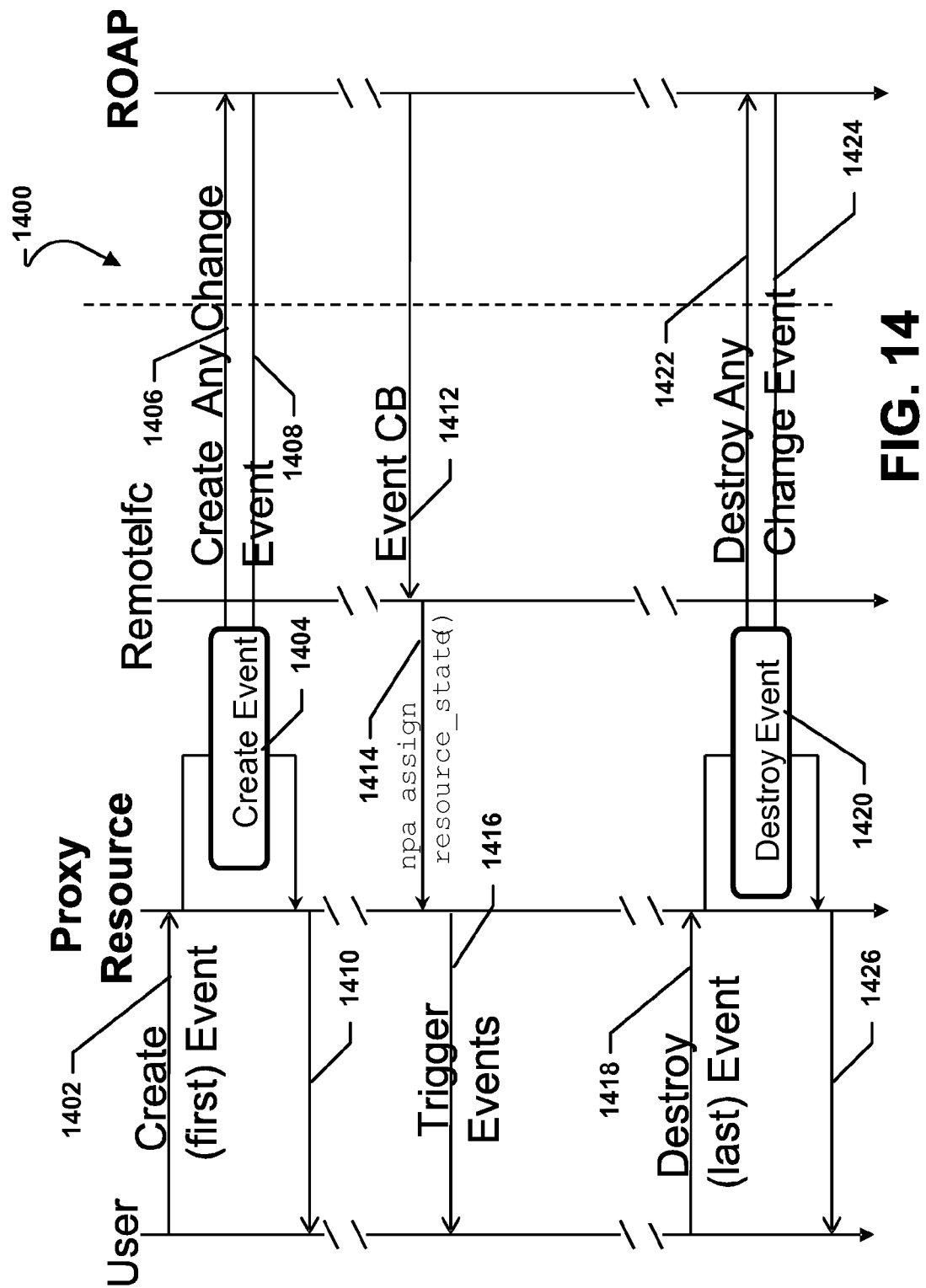
FIG. 14 is a flowchart illustrating a method of using a proxy resource.

Referring to FIG. 14, a method of using a proxy resource is shown and is generally designated 1400. At step 1402, a user may issue a create event to the proxy resource. At step 1404, the proxy resource may invoke a create event function. At step 1406, the proxy resource may issue a create any change event to a ROAP through a remote interface. At step 1408, the ROAP issues a response that may be returned to the proxy resource via the remote interface. The proxy resource may send the response to the user at step 1410.

At step 1412, the ROAP issues an event callback to the proxy resource via the remote interface. At step 1414, the proxy resource may invoke an npa_assign_resource_state function in response to the event callback. Then, at step 1416, the proxy resource may issue one or more trigger events to the user.

Moving to step 1418, the user may issue a destroy event to the proxy resource 1420. At step 1422, the proxy resource may invoke a destroy event function that may trigger a destroy any change event, at step 1422, that may be transmitted to the ROAP via the remote interface. The ROAP may transmit a response to the destroy any change event at step 1424 through the remote interface to the proxy resource. The proxy resource may pass the response to the user at step 1426.

Figure 15:
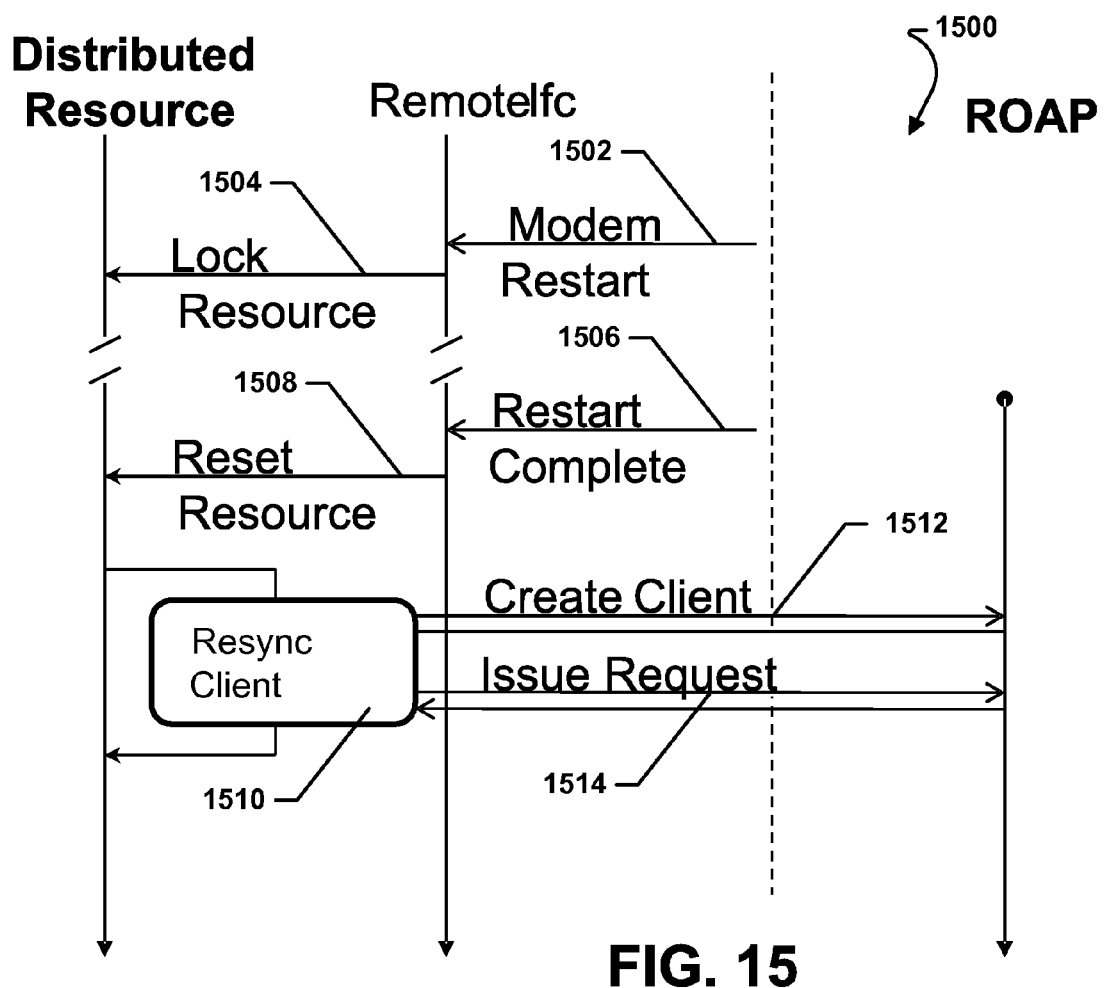
FIG. 15 is a flowchart illustrating a method of transparently handling processor restarts across a remote interface.

FIG. 15 illustrates a method of transparently handling processor restarts across a remote interface, generally designated 1500. Beginning at step 1502, a ROAP, in this case a modem, may issue a modem restart to the remote interface. At step 1504, the remote interface issues a lock resource to the distributed resource.

At step 1506, the ROAP may indicate that the restart is complete to the remote interface. The remote interface may then issue a reset resource to the distributed resource, at step 1508. Next, at step 1510, the distributed resource may invoke a resync client function. Then, at step 1512, the distributed resource may issue a create client request to the ROAP via the remote interface. At step 1514, the distributed resource may issue a work request to the ROAP via the remote interface. The method 1500 may then end.

In a particular aspect, each resource may define whether it is to be accessed remotely. If a resource does not define that it may be accessed remotely, remote clients and remote events may not be created. Further, the remote command protocol may be transport agnostic. The same commands may be used with multiple inter-processor transports, even simultaneously. In particular, the same command protocol may be used between user space and kernel space as well as for remote access.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device, a netbook computing device, a laptop computing device, a desktop computing device, or a combination thereof.

With the configuration described herein, the present system and methods may create a common software solution for defining and making requests of dynamic resources. Further, the system and method may natively handle concurrent requests and allow power optimization while meeting client quality of service (QoS) requirements with minimal client impact. Further, the system and methods may allow software (SW) and hardware (HW) feedback of resource utilization for optimization purposes. Using the system and methods disclosed herein resource dependencies may be expressed as data and not as code. Further, actions may be triggered off of resource state changes. Additionally, the system and methods may substantially improve visibility into system definition and resource utilization and substantially improve build times and integration issues.

In a particular aspect, resource names should be unique across the resource graph. The resources may be named using a filesystem metaphor with a top level such as, /bus/ . . . ; [ahb|axi| . . . ], /clk/ . . . ; [tcxo|cpu| . . . ], /core/ . . . ; [cpu gfx| . . . ], /pwr/ . . . ; [c1|c2| . . . ], etc. In another aspect, client names may be used for information purposes and do not need to be unique. The following convention may be used for clients created by technologies: system/subsystem[/subsystem]/usecase, e.g., modem/cdma/srch/idle. Clients that are created by other resources may be named after the creating resource.

In another particular aspect, the NPA structures may be dynamically created at runtime. A fixed-size memory pool allocator may be used to prevent fragmentation, minimize allocation costs. The pools may be initialized with user-allocated memory. Further, pools may be optionally extended via heap allocations, but heap support is not required. Moreover, memory that is added to pools may not be freed.

For debugging purposes, all client work requests and resource state changes may be captured in a common log. Specifically, clients and resources may be logged by name for improved readability. An active client list may provide insight into resource utilization. During debugging, the update function for a resource may be dynamically overridden to force the resource into a known state. This may defer power management during an initial bring-up phase and may isolate power management during bug hunts. In addition, the active clients and resource state may be retrieved programmatically at runtime or via other utilities while halted.

In a particular aspect, compile-time coupling may be minimized. Client/Resource binding may be accomplished via name lookup and lookup may be resolved at initialization time. Moreover, clients may be dynamically allocated and there may not be a fixed enumeration-based set of clients. Clients may be accessed via handles, i.e., opaque structure pointers. Also, there may not be any visibility into actual client data structure by clients.

The NPA system described herein may provide a mechanism for defining dependencies. Moreover, the NPA system may allow arbitrary order of definition while sequencing initialization in dependency order. Subsystems may own their dependencies, but they may also use NPA dependency management to sequence initialization without needing to adopt an NPA-style interface. If adopted comprehensively, subsystem startup may be done in an arbitrary order. This may substantially reduce start-up maintenance and substantially increase robustness of and visibility into the startup sequence. Also, this may be extended to automatically parallelize startup sequences on multi-core processors.

In a particular aspect, resources may explicitly list which other resources they depend upon. Clients and non-resources may register for an event, e.g., a callback/signal, when a required resource exists. Further, definition and creation may be logged. Subsystems may define logical/init resources to allow other subsystems to express initialization dependencies and allow the NPA system to properly sequence system startup. There is no requirement that a subsystem support an NPA-style request interface. However, subsystems may, in turn, leverage NPA dependency management and initialization sequencing for their own dependencies.

In one or more exemplary aspects, the functions described may be implemented in hardware, software, firmware, or any combination thereof. If implemented in software, the functions may be stored on or transmitted over as one or more instructions or code on a computer program product such as a machine readable medium, i.e., a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A computer-implemented method of utilizing a node architecture for managing resources within a single hand-held portable computing device, the method comprising:
    establishing, by a processor, a software system for managing both hardware and software of the single hand-held portable computing device, the software and hardware being trackable with a resource graph in which each software is represented as a client and each hardware is represented as a node;
    receiving, with a processor, a request generated by an executing software application operative on the single hand-held portable computing device for a resource to create a client handle, the client handle comprising an opaque structure pointer, the resource comprising hardware within the single hand-held portable computing device, the executing software application performing a function on the single hand-held portable computing device, wherein the request includes a work model that comprises at least one of a registered workload, an impulse workload, an isochronous workload, a pulsed workload, a best effort workload, a scheduled workload, or a combination thereof;
    determining, with the processor, whether the resource is compatible with the request;
    returning, with the processor, a client handle return value when the resource is compatible with the request;
    receiving a new work request with the processor;
    aggregating with the processor the new work request with any pending work requests;
    determining a resource state with the processor based on the new work request and the pending work requests;
    applying the resource state to the resource with the processor;
    performing the work request with one of the processor and the resource;
    receiving a request with the processor to destroy the client handle; and
    destroying the client handle with the processor.

2. The computer-implemented method of claim 1, further comprising: issuing a dependency request to a dependent resource with a processor if the resource is unable to perform the work request.

3. The computer-implemented method of claim 2, further comprising: outputting a trigger event with a processor if a dependent resource is unavailable.

4. A single hand-held portable computing device, comprising:
    a processor, wherein the processor is operable to:
        establish a software system for managing both hardware and software of the single hand-held portable computing device, the software and hardware being trackable with a resource graph in which each software is represented as a client and each hardware is represented as a node;
        receive a request generated by an executing software application operative on the single hand-held portable computing device for a resource to create a client handle, the client handle comprising an opaque structure pointer, the resource comprising hardware within the single hand-held portable computing device, the executing software application performing a function on the single hand-held portable computing device, wherein the request includes a work model that comprises at least one of a registered workload, an impulse workload, an isochronous workload, a pulsed workload, a best effort workload, a scheduled workload, or a combination thereof;
        determine whether the resource is compatible with the request;
        return a client handle return value when the resource is compatible with the request;
        receive a new work request;
        aggregate the new work request with any pending work requests;
        determine a resource state based on the new work request and the pending work requests;
        apply the resource state to the resource;
        perform the work request or assign to the resource;
        receiving a request to destroy the client handle; and
        destroy the client handle.

5. The single hand-held portable computing device of claim 4, wherein the processor is further operable to: issue a dependency request to a dependent resource if the resource is unable to perform the work request.

6. The single hand-held portable computing device of claim 5, wherein the processor is further operable to: output a trigger event if a dependent resource is unavailable.

7. A non-transitory computer readable memory medium of a single hand-held portable computing device, comprising:
    at least on instruction for establishing a software system for managing both hardware and software of the single hand-held portable computing device, the software and hardware being trackable with a resource graph in which each software is represented as a client and each hardware is represented as a node;
    at least one instruction for receiving a request generated by an executing software application operative on the single hand-held portable computing device for a resource to create a client handle, the client handle comprising an opaque structure pointer, the resource comprising hardware within the single hand-held portable computing device, the executing software application performing a function on the single hand-held portable computing device, wherein the request includes a work model that comprises at least one of a registered workload, an impulse workload, an isochronous workload, a pulsed workload, a best effort workload, a scheduled workload, or a combination thereof;

at least one instruction for determining whether the resource is compatible with the request;

at least one instruction for returning a client handle return value when the resource is compatible with the request;

at least one instruction for receiving a new work request with the processor;

at least one instruction for aggregating with the processor the new work request with any pending work requests;

at least one instruction for determining a resource state with the processor based on the new work request and the pending work requests;

at least one instruction for applying the resource state to the resource with the processor;

at least one instruction for performing the work request with one of the processor and the resource;

at least one instruction for receiving a request with the processor to destroy the client handle; and at least one instruction for destroying the client handle with the processor.

8. The non-transitory computer readable memory medium of claim 7, further comprising: at least one instruction for issuing a dependency request to a dependent resource if the resource is unable to perform the work request.

9. The non-transitory computer readable memory medium of claim 8, further comprising: at least one instruction for outputting a trigger event if a dependent resource is unavailable.

* * * * *